US008108248B2

(12) United States Patent
Seuken et al.

(10) Patent No.: US 8,108,248 B2
(45) Date of Patent: Jan. 31, 2012

(54) MARKET DESIGN FOR A RESOURCE EXCHANGE SYSTEM

(75) Inventors: Sven Seuken, Cambridge, MA (US); Denis Xavier Charles, Bellevue, WA (US); David Maxwell Chickering, Bellevue, WA (US); Siddhartha Puri, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 12/399,043

(22) Filed: Mar. 6, 2009

(65) Prior Publication Data

US 2010/0228598 A1 Sep. 9, 2010

(51) Int. Cl.
*G06Q 10/00* (2006.01)
(52) U.S. Cl. ...................................... 705/7.35
(58) Field of Classification Search ................ 705/8, 1.1
See application file for complete search history.

(56) References Cited

U.S. PATENT DOCUMENTS

| | | | |
|---|---|---|---|
| 6,085,164 A | 7/2000 | Smith et al. | |
| 7,080,034 B1 | 7/2006 | Reams | |
| 7,133,835 B1 | 11/2006 | Fusz et al. | |
| 7,257,561 B1 | 8/2007 | Abe | |
| 2001/0037311 A1* | 11/2001 | McCoy et al. | 705/65 |
| 2005/0195743 A1* | 9/2005 | Rochberger et al. | 370/235 |
| 2008/0243710 A1 | 10/2008 | Borts | |
| 2010/0228598 A1* | 9/2010 | Seuken et al. | 705/10 |

OTHER PUBLICATIONS

Aperjis, et al, "A Peer-to-Peer System as an Exchange Economy", 2006.*
Gerke, et al., "Peer-to-Peer Market Management", Retrieved at <<http://hausheer.osola.com/publications/market-management-final.pdf>>, Aug. 2005, pp. 1-19.
Aperjis, et al., "A Peer-to-Peer System as an Exchange Economy", Retrieved at <<http://www.stanford.edu/group/reputation/draft_tr.pdf>>, Oct. 2006, pp. 1-13.
Vishnumurthy, et al., "Karma: A Secure Economic Framework for Peer-to-Peer Resource Sharing", Retrieved at <<http://www.cs.cornell.edu/~vivi/karma.pdf>>, 2003, pp. 1-6.
Yeo, et al., "A Taxonomy of Market-based Resource Management Systems for Utility-Driven Cluster Computing", Retrieved at <<http://www.buyya.com/papers/UtilityClusterRMSTaxonomy.pdf>>, Jun. 8, 2006, pp. 1381-1419.
Turner, et al., "A Lightweight Currency Paradigm for the P2P Resource Market", Retrieved at <<http://cis.poly.edu/~ross/papers/LightweightParadigm.pdf>>, Sep. 9, 2003, pp. 1-15.
Unknown, "Wuala—Technology", Retrieved at <<http://wuala.com/en/learn/technology>>, Jan. 13, 2009, pp. 1-2.

* cited by examiner

*Primary Examiner* — Shannon Campbell

(57) ABSTRACT

Providing a market design for a peer-to-peer resource exchange system. Prices for a plurality of resources such as storage space, upload bandwidth, and download bandwidth are calculated and balanced based on previous resource prices, a supply of the resources, and a demand for the resources. Further, prices for operations such as storage and retrieval are determined such that a total of the payments to resource suppliers equals a total of the payments received from the resource consumers. In some embodiments, incoming data operation requests are allocated to the peers such that equilibrium among the peers is achieved.

13 Claims, 8 Drawing Sheets

MARKET DESIGN FOR A RESOURCE EXCHANGE SYSTEM

BACKGROUND

Individuals often lack the infrastructure to set up and maintain remote computer-readable storage media. Existing systems provide a business model that provides access to remote computer-readable storage media to multiple individual consumers via common networking protocols and mechanisms, such as the ubiquitous World Wide Web (WWW). Traditionally, those offering such remote backup services to individual consumers maintain one or more data centers comprising the computer-readable storage media that is being used to remotely store the consumers' computer-readable data.

In existing peer-to-peer (P2P) resource exchange systems, individual users (e.g., peers) provide resources in exchange for resources from other users. To incentivize users to provide their resources, an accounting system keeps track of how many resources each user has supplied and consumed, to make sure this is balanced in the long run. These systems get more complicated, however, when the resources from different supplying peers are bundled before they can be consumed by other peers. If the system is flexible enough such that different peers can supply different amounts of the resources, simply balancing each user's account per resource is inefficient because it ignores the different users' preferences. Existing systems fail to elicit user preferences and to determine the optimal exchange rate or prices between the different resources such that system efficiency is maximized.

SUMMARY

Embodiments of the invention provide a market design for a peer-to-peer resource exchange system. A supply of each of a plurality of resources is determined. The demand for each of the plurality of resources is determined. A plurality of previous prices for each of the plurality of resources is accessed. A ratio of the determined supply to the determined demand is defined for each of the plurality of resources. A price for each of the plurality of resources is calculated based on the accessed prices and the defined ratio such that the defined ratios for the plurality of resources are equal. In some embodiments, a user interface allows a user to interact with the market without being made aware of the prices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure provide, at least, a peer-to-peer resource exchange system having consumers and suppliers. Each of a plurality of available resources, operations, or services has a price at which the resource can be traded. In each transaction, the suppliers are paid for providing the resources and the consumers are charged for consuming the resources. Prices are updated regularly according to current supply and demand in the system to bring prices into equilibrium.

In some embodiments, the resource exchange system is a storage exchange system. Instead of storing data on centralized servers, the data is stored in a distributed fashion on other computing devices. Distributed backup systems save costs for a centralized data center because unused or free resources (e.g., storage space, inbound bandwidth, and outbound bandwidth) can be utilized. Further, the reliability and accessibility of the system may be greater than that of centralized backup systems. To provide availability, the data is replicated to a certain degree. Aspects of the disclosure use erasure coding where individual file fragments are intelligently distributed over multiple peers devices to minimize the replication factor as much as possible. In some embodiments, the disclosure uses an architecture that is a hybrid between a peer-to-peer system and a server-based system. Backup data is directly transferred between two peer devices, but a dedicated server coordinates operations and maintains meta-data on each backup.

While embodiments of the disclosure are described with reference to storage resources being exchanged, the disclosure is not limited to the exchange of storage space. Other computing resources that can be shared and distributed are within the scope of the disclosure. Other resources include, for example, upload bandwidth and download bandwidth. Further, the resource exchange system may be implemented as a centralized mechanism, or distributed among a plurality of computing devices. In some embodiments, the consumers are linked with the suppliers to enable the exchange of resources through peer-to-peer communication.

Further, computational capacity may be one of the resources that is shared and distributed among peers. In such an embodiment, the system is a computational exchange service where jobs are submitted to be performed on a quantity of peers. The jobs are paid for by downloading jobs, working on the downloaded jobs, and uploading the results of the completed jobs.

Exemplary Storage Exchange System

Figure 1:
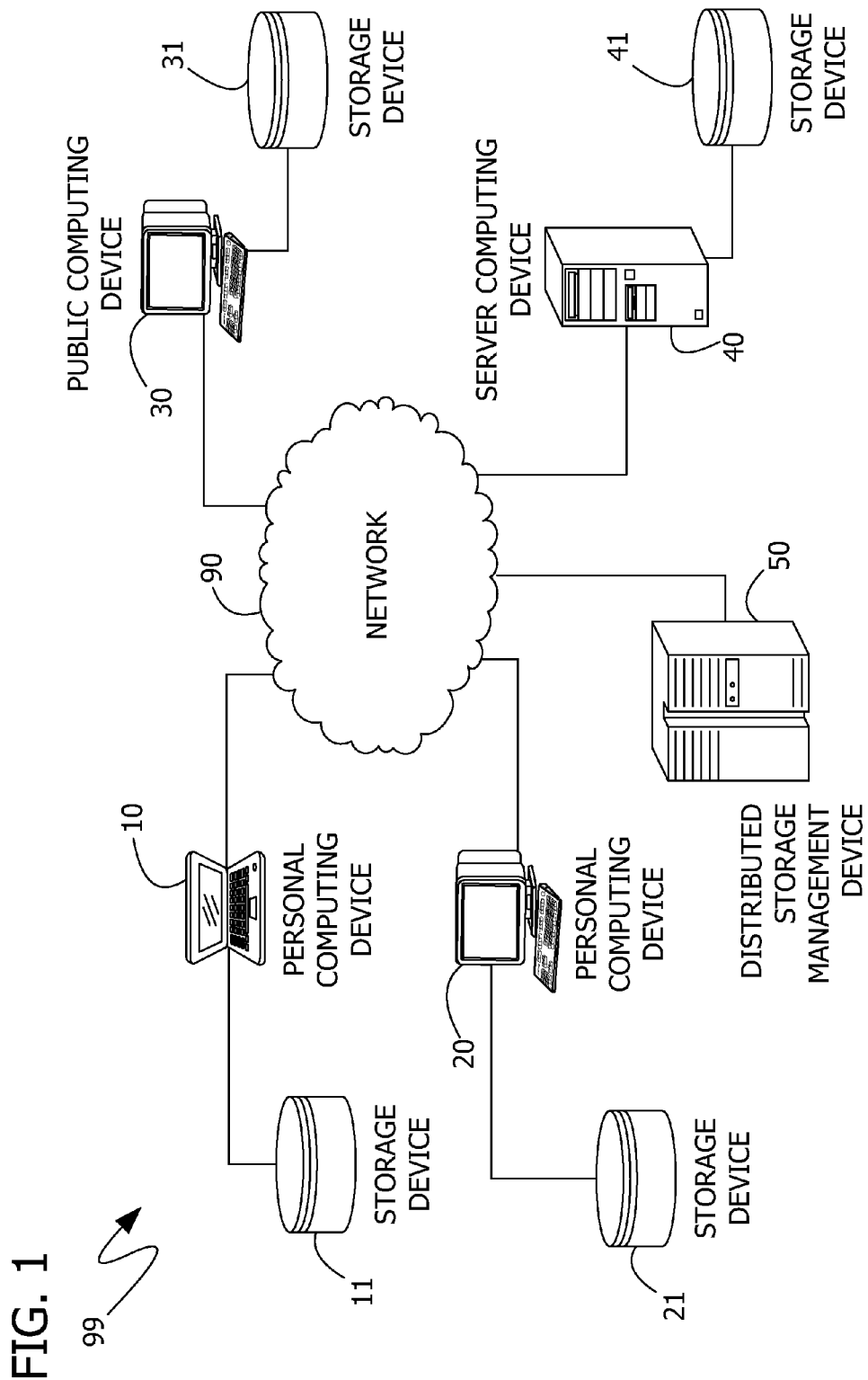
FIG. 1 is an exemplary block diagram illustrating a plurality of computing devices operating within a peer-to-peer resource exchange system.

Referring again to FIG. 1, an exemplary block diagram illustrates a plurality of computing devices operating within the peer-to-peer resource exchange system. In the example of FIG. 1, the resource exchange system is a distributed data backup system. An exemplary network system 99 is illustrated comprising the network 90 itself, personal computing devices 10 and 20, a public computing device 30, a server computing device 40, and a distributed storage management device 50, all connected to the network 90. Each of the computing devices 10, 20, 30 and 40 comprise storage devices 11, 21, 31 and 41, respectively, that can be co-located with the computing devices. Examples of such co-located storage devices include both computer-readable storage media that is internal to a computing device case and computer-readable storage media that can be connected to the computing device via local cabling.

In some embodiments, some or all of the storage capacity of the storage devices 11, 21, 31 and 41 can be offered by the respective computing device 10, 20, 30 and 40 to the other computing devices connected to the network 90. Such a decision may be made by administrators of the computing devices 10, 20, 30 and 40, or, in multi-user environments, each user of the computing devices 10, 20, 30 and 40 offers some or all of the storage capacity that is allocated to that user from the storage devices 11, 21, 31 and 41. Similarly, some or all of the processing capability of the computing devices 10, 20, 30 and 40 may be offered for use by other computing devices connected to the network 90.

A centralized server, such as the distributed storage management device 50, receives offers to share storage space, processing capability, or other sharable computing resources from the computing devices 10, 20, 30 and 40 or, more precisely, from one or more users or administrators of those computing devices. The distributed storage management device 50 maintains account information for each user and credits each user's account an appropriate amount of credits based on the amount of resources used from that user, the length of time such resources were offered or available, the reliability of such resources, and/or other information. The amount of credits given based on such resources may be further influenced by a conversion factor that can be adjusted by the distributed storage management device 50 based, at least in part, on the balance within the system 99 between outstanding credits and offered, but unused, resources. Consumers pay credits to the distributed storage management device 50 and the distributed storage management device 50 pays credits to the suppliers. Each user starts out with a balance of zero and is allowed to take on a certain maximal deficit. Once the user reaches that deficit level, the user is not allowed to make further backups before the balance increases again. Accounting for the resources may be done in the following units:

TABLE 1

Definition of units of each resource.

| Resource | Minimal Unit |
| --- | --- |
| 1. Upload Bandwidth | 1 Fragment (64 KB) |
| 2. Download Bandwidth | 1 Fragment (64 KB) |
| 3. Storage Space | 1 Fragment (64 KB)/day |

In some embodiments, a server account balance is also maintained. That balance starts out at zero and goes negative or positive. For example, if a tax is charged on each operation and the tax revenue goes to the server, the server's account balance increases over time. Those credits are then used, for example, to sell backup services on a secondary market.

Figure 2:
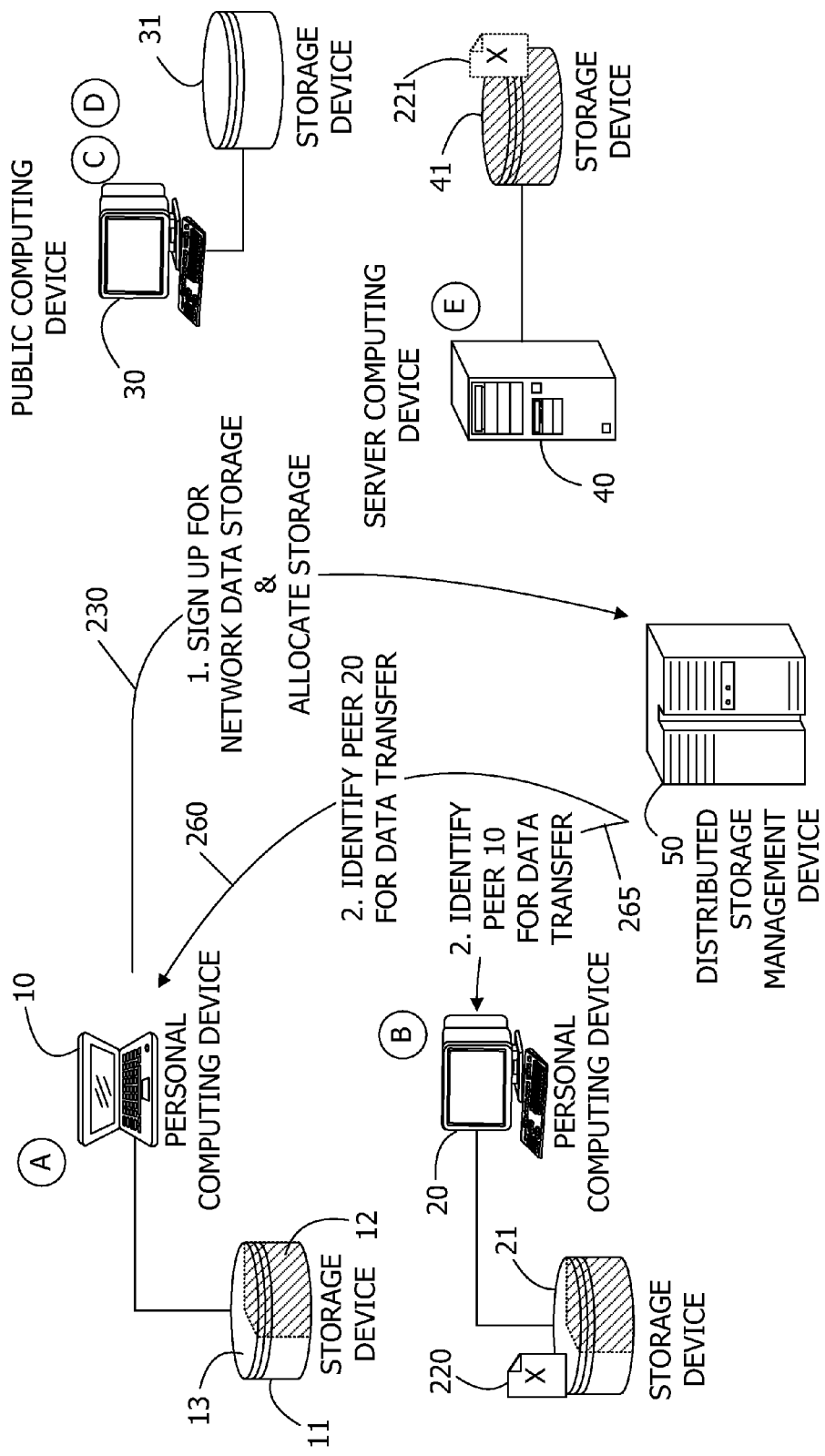
FIG. 2 is an exemplary block diagram illustrating communications to identify peer computing devices for resource exchange.

Referring next to FIG. 2, an exemplary block diagram illustrates identification of peer computing devices for resource exchange. The distributed storage management device 50 matches a peer computing device that seeks to use a distributed resource with a peer computing device that is offering such a resource for use. The distributed storage management device 50 identifies such peers to one another, thereby enabling peer-to-peer communication to implement the resource sharing. In some embodiments, the distributed storage management device 50 does not handle or store the shared data; instead, such sharing occurs strictly between identified peers.

In operation, to offer shared resources, a user, such as user A, uses a computing device, such as A's personal computing device 10, to offer shared resources to a management device, such as the distributed storage management device 50. A message 230 from the computing device 10 requests that the distributed storage management device 50 create a new entry in the database 210 reflecting the addition of the account of user A. Included with the message 230 also includes information regarding the amount of resources being shared, such as the amount of storage capacity being shared 12. And, in addition to sending message 230, the computing device 10 can also set aside the shared storage capacity 12 of the storage device 11, thereby separating it from the storage capacity 13 being retained for local access by the computing device.

Upon receipt of a notification of shared resources, such as message 230, the distributed storage management device 50 creates an appropriate account for the requesting user within the database 210. Thus, a new account for user A is created by the distributed storage management device 50. The distributed storage management device 50 also identifies one or more computing devices, such as computing device 20, that may have requested a shared resource, and can identify both the sharing and requesting computing devices to one another. For example, the distributed storage management device 50 notifies the computing device 10, via message 260, of the computing device 20 that may have requested the use of remote storage capacity. Similarly, via message 265, the distributed storage management device 50 notifies computing device 20 of the computing device 10 that has volunteered to host shared storage capacity 12.

In response to such messages from the distributed storage management device 50, client software on the computing devices 10 and 20 initiates peer-to-peer communication 270 and transfers data from the requesting computing device 20 to the sharing computing device 10. For example, in the exemplary system 250, the computing device 20 may comprise a locally stored file 220 that it seeks to backup remotely. Consequently, once it receives a message, such as message 265, client code on the computing device 20 can, transparently to the user B, transfer some or all of the data of the file 220 to the shared portion 12 offered by the computing device 10. File 221 on storage device 41, is meant to represent some or all of file 220 that can be remotely stored in a secure and fault-tolerant manner.

In some embodiments, erasure coding is used for the backup, although other forms of coding are contemplated. Using an erasure code, a file having k fragments such as $F=(F1, \ldots, Fk)$ is transformed into $G=(G1, \ldots, Gn)$ where $n \geq k$ such that any k fragments of G are enough to reconstruct F. The fraction n/k is the replication factor. The difference between n and k depends on the availability of the individual peers. If all peers were continuously online, n equals k and the replication factor is 1. The smaller the availability of the individual peers, the larger the resulting replication factor. A peer's availability is represented by the variable a and is between zero (e.g., corresponding to never being online) and one (e.g., corresponding to continuously being online). If all of the peers have an availability of a and to guarantee that the backed up file can be reconstructed with probability 1−ε, the following Equation (1) describes how many fragments are produced.

$$n_0 = \underset{n}{\arg\min} \sum_{k \leq i} \binom{n}{i} a^i (1-a)^{n-i} \geq 1 - \varepsilon \qquad (1)$$

If a <1, the replication factor is larger than 1 (e.g., for every gigabyte of data that the user wants to backup, the peers that the server chooses as suppliers give up more than a gigabyte of combined storage space).

In some embodiments, client software, such as on the computing device 20 that is remotely backing up the file 220, encrypts the file 220 and then divides the encrypted file into segments such that, even if some segments were to be lost, the encrypted file could be reconstructed and decrypted into file 220.

While the above descriptions have included the operation of the distributed storage management device 50 as an explicit computing device, in some embodiments the operations of the distributed storage management device 50 are performed by one or more server applications executing in a distributed fashion on one or more of the computing devices 10, 20, 30 and 40. For example, using consensus algorithms, such as the known Paxos algorithms, computing devices 10, 20, 30 and 40 could independently maintain databases equivalent to the database 390, such that, so long as a majority of the computing devices 10, 20, 30 and 40 remained operational, the overall system 370 could continue to function and continue to update the database appropriately.

Figure 3:
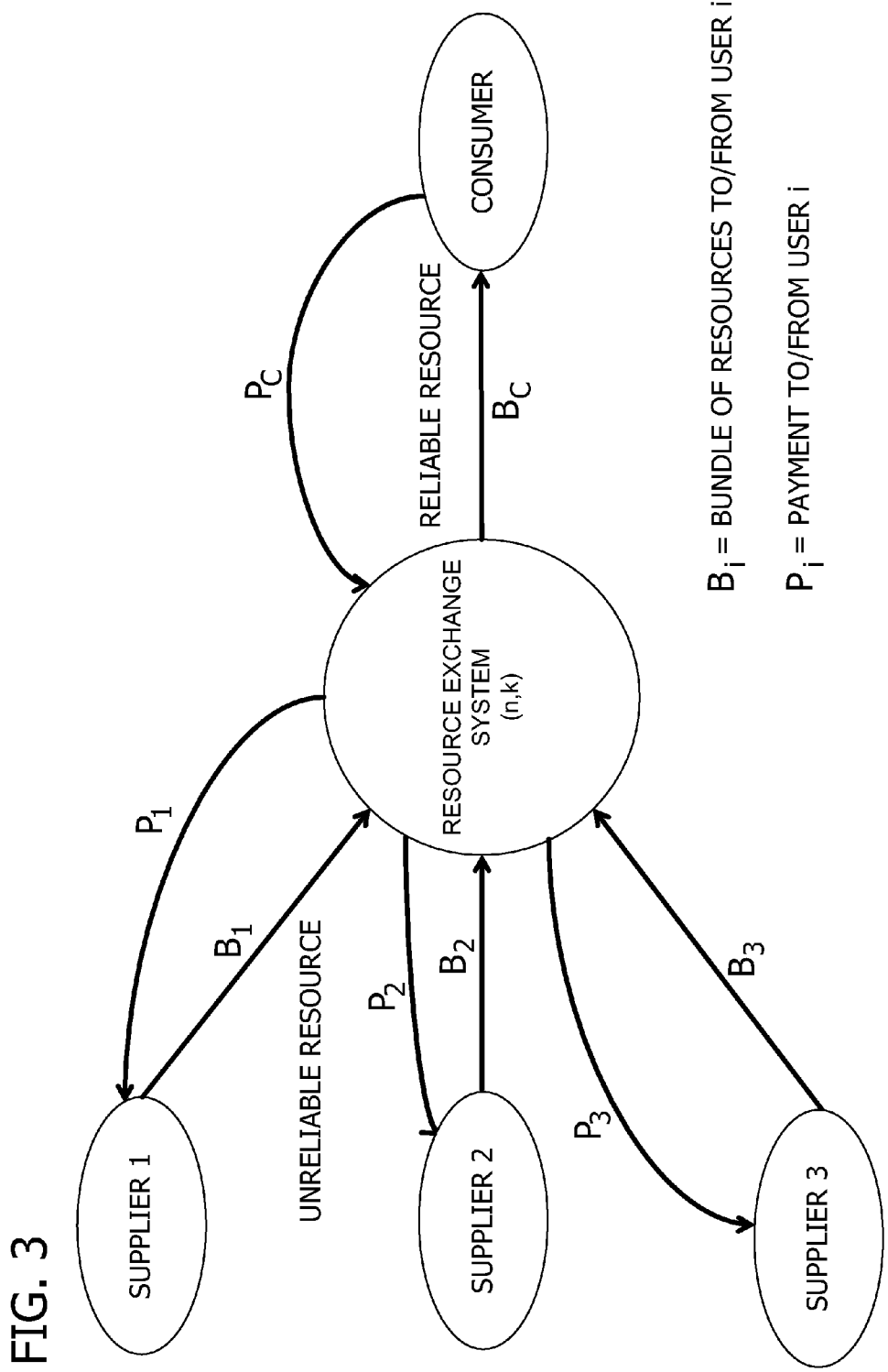
FIG. 3 is an exemplary block diagram illustrating the resource exchange system converting unreliable storage into reliable storage.

Referring next to FIG. 3, an exemplary block diagram illustrates the resource exchange system converting unreliable storage into reliable storage. The storage exchange system buys unreliable storage and produces reliable storage. Aspects of the invention find the optimal prices at which to buy each bundle from the suppliers and to find the optimal prices at which to sell bundles to the customers. Each user (e.g., consumer or supplier) has full control over how many resources to supply, and is simultaneously both a supplier and consumer. A particular supply of resources allows the user to consume a particular amount of resources (e.g., backup services) in exchange, defined via the current prices for all resources. Because each user has different preferences regarding the resources to supply and the resources to consume, each user supplies a different bundle of resources. For example, for every backup, there are multiple peers on the supplier side offering their resources and a single peer on the consumer side asking for these resources.

Each peer on the supplier side is offering a different bundle of resources/services (i.e., different storage space, different availability, different bandwidth speeds) while each peer on the consumer side gets the same product (e.g., a backup service with the same reliability). Thus, embodiments of the invention use heterogeneous input goods and produce a homogeneous output good. In some embodiments, a bundle B=(s, bu, bd, a) where s is storage space (e.g., measured in quantity of fragments), bu is upload bandwidth (e.g., measured in KB/s), bd is download bandwidth (e.g., measured in KB/s), and a is a probability of being available (e.g., a value between zero and one where one corresponds to 24 hours/day).

The user controls s, bd and bu explicitly via aspects of the invention by defining caps on the maximum supply of these resources. A user's availability, however, is determined over time depending on how long the user is online every day. In some embodiments, a user's bundle has four components while there are only three resources. The user gets paid for availability indirectly. The price a user is paid for storage is dependent on that user's availability. The price a user is paid for upload and download traffic is not dependent on availability, however, the user's bandwidth can be used if the user is available and thus the user can earn credits for bandwidth use when online.

Operations

In some embodiments, for every backed up file, five operations are performed by individual peers. During a backup operation, when the user initiates a new backup, file fragments are moved from the consumer to the suppliers. During a storage operation, the suppliers persistently store the fragments received on a hard drive or other storage medium. During a retrieval operation, when the user wants to retrieve a backup, file fragments are moved from the suppliers that previously stored the fragments to the consumer. During a testing operation, the system periodically checks each file fragment and determines whether it is still available on the supplier's machine. This is done by initiating the testing operation where one peer downloads the fragment from the supplier. During a repair operation, when a backup has been determined to be unhealthy (e.g., because too many fragments are no longer available or the availability of the suppliers has decreased), the backup is rejuvenated. This is done via the repair operation where a peer downloads fragments for reconstructing the backup, then creates new fragments using erasure coding, and then distributes the new fragments to new suppliers. Each of these operations uses a particular set of resources from the suppliers.

As such, aspects of the disclosure are characterized by an asymmetry. For the user to back up 1 GB of data, the user stores more than 1 GB of data in exchange. For the bandwidth resources, the user backs up data once and retrieves it once, but the periodic testing and repair operations performed to maintain the health of the backup also consume bandwidth, even if those operations are not directly initiated by the consumer.

TABLE 2

Operations and their resources.

| Operation | Resources Required from Suppliers |
|---|---|
| 1. Backup | Download Bandwidth |
| 2. Storage | Space |
| 3. Retrieval | Upload Bandwidth |
| 4. Testing | Download and Upload Bandwidth |
| 5. Repair | Download and Upload Bandwidth |

In some embodiments, the supplying peers provide their download bandwidth when a file is backed up, hard disk space to store the file, and upload bandwidth when the user wants to retrieve the backup.

There is a correlation between the amounts of different resources from an individual peer. For example, the more backups an individual supplier has stored on a hard disk, the more often one of the corresponding consumers retrieves the backup and thus uses the supplier's upload bandwidth.

Each user has different preferences regarding how much of each resource to supply. Some users are very constrained regarding the free space on a hard drive but might have a high bandwidth connection and would prefer to give up bandwidth rather than storage space. Other users might have very large hard drives but use their bandwidth for many other services like voice over Internet protocol (VOIP), file sharing, or the like. In some embodiments, the server has control over which peers a consumer uses for a retrieval operation. Thus, the server assigns more or less upload work to a particular supplier if desired. The testing and repair operations give the server another opportunity to optimize the resource usage for different peers. The server chooses who performs the testing and repair and thus the download bandwidth of that peer is used more or less. Embodiments optimize the resource usage based on the hotness or coldness of the backup data is known (e.g., whether the data is retrieved often or rarely). For example, a user who has a lot of space but would prefer not to give up much bandwidth would get more of the cold backups.

User Interface

Figure 4:
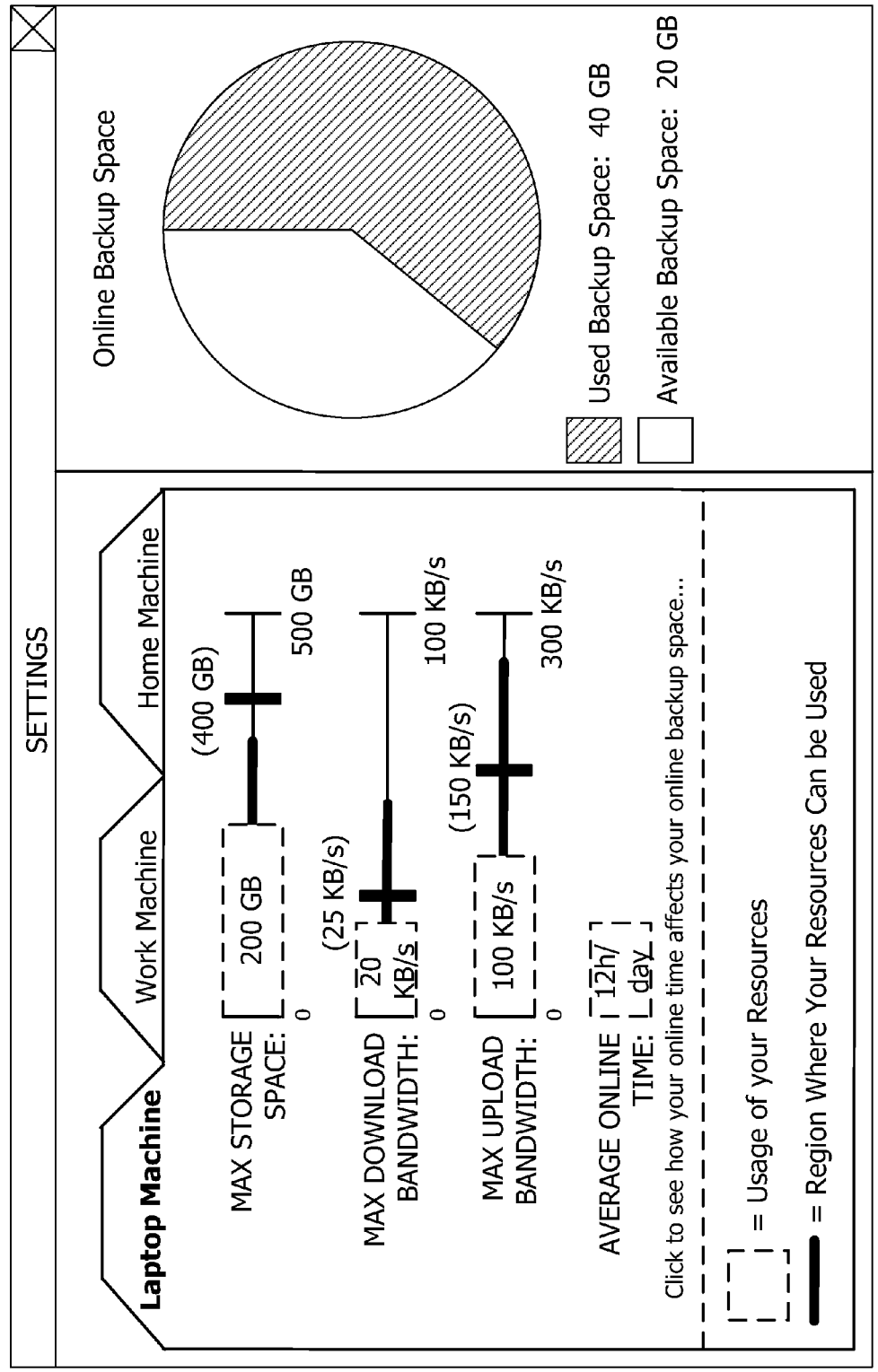
FIG. 4 is an exemplary user interface illustrating entry of resource settings and corresponding available storage space.

Referring next to FIG. 4, an exemplary user interface illustrates entry of resource settings and corresponding available storage space. In general, the user interface has at least a first portion and a second portion. In the first portion, the user provides resource settings for each of a plurality of resources. The resource settings indicate portions or allocations of the resources made available to the resource exchange system. The provided resource settings are provided for display in the first portion of the user interface.

The second portion shows how much of the resource the user gets (e.g., a resource balance) in return for the provided resource settings. The resource balance for the user is determined based on the resource settings. The calculated resource balance indicates the storage space available to the user in the resource exchange system. In some embodiments, the resource balance is calculated by calculating an average consumption of the resources, and a maximum consumption of the resources. The calculated resource balance is provided for display to the user in the second portion of the user interface.

Via the first portion of the user interface, the user adjusts one or more of the resource settings. Responsive to the adjustment, the resource exchange system recalculates the resource balance and updates the displayed resource balance in the second portion of the user interface with the recalculated resource balance.

FIG. 4 displays a "settings window" that the user opens to control resources and look at a resource balance. This tab has two distinct areas in some embodiments. On the left side, the user controls resources and on the right side, the user sees the resource balance (e.g., the pie chart). On the left, for each of the resources, the user sets a maximum cap for that resource by moving the sliders to specify how much of that resource is to be maximally used from the user. That usage includes operations that use this peer as a supplier and operations where this peer is the consumer. The maximum value for these sliders is determined by embodiments of the disclosure. The maximum value for the storage space can be determined by looking at how much space is left on the user's hard drive for storing backups. The maximum values for upload and download bandwidth may be determined via a speed test or through direct user input. An alternative includes not displaying any maximum values and instead using a user interface for the sliders that lets the user choose the position without a maximum.

When moving the sliders, the user's resource balance on the right side of the user interface increases or decreases. The current usage of resources is displayed (e.g., how much of those resources the user is currently supplying). For the caps, this includes both usages: those that are initiated by the user and those that are not. Those supply values are averaged over a time period (e.g., one month). For availability, the user does not have a slider but instead the average availability over the last month is measured or estimated and then displayed. The user clicks on the availability and a graph shows the amount of online backup space the user would get for each possible availability.

The resource balance on the right side of the user interface is determined by two numbers, in some embodiments: 1) the user's current usage of storage (in GB) and 2) the storage space available to that user (in GB). The available storage space represents a prediction regarding how much more data that user could backup before hitting the resource caps taking into account that user's past behavior regarding the frequency of backup and retrieval operations. Intuitively, the distance between the bars and the sliders in the user interface represent the amount of resources the user is willing to supply but are currently unused. The resource balance pie chart on the right side of the user interface tries to aggregate all three resources into one resource (e.g., storage) if the user would increase his resource consumption.

The user interface allows the user to see and experience current market prices simply by moving the sliders and looking at the pie chart. If the user moves the slider a little and the resource balance only moves a little, this means that the current price for that resource is relatively low. If the user moves another slider a little and the pie chart moves a lot, this implies that the current market price for that resource is relatively high. In the user interface, the account balance is the current number of credits the user has (e.g., negative or positive) which is close to zero. The resource balance includes two quantities: 1) the amount of data the user has backed up and 2) the amount of data the user could still back up given the current resource caps.

If the user wants to specify the resource balance, without having to move all three sliders, the user directly adjusts or moves the pie chart. The user moves the line between the available space and the used space regions of the pie chart up or down. All three sliders are automatically moved proportionally to their original positions.

Aspects of the disclosure are operable with multiple machines. For example, the user could use a home machine primarily for supplying resources, while using a laptop to backup personal data. To indicate to the user that the pie chart is an aggregated view based on all the machines, the user interface shows one tab for each of the machines. On each tab, the user can inspect and adjust the sliders for the particular machine.

If the user keeps increasing one slider towards the maximum while the other two sliders are relatively low, the resource balance pie chart at some point stops increasing. For example, if the user limits upload bandwidth to 5 kbps, increasing space from 50 GB to 100 GB does not increase the maximum amount allowed to be consumes because the system would not store more than 100 GB on this user because 5 kbps would not be enough to have a reasonable retrieval rate. In the user interface, the area where the slider has an effect on the resource balance is shown as a thick black line. Once the user moves one slider beyond the point where the line is thick, the resource balance on the right does not change any more. Moreover, when the user moves one slider, the effective slider regions for the other resources (e.g., the thick lines) change accordingly. When one slider is moved up, the effective slider regions for the other two resources increase. When one slider is moved down, the effective slider regions for the other two resources decrease.

In computing the resource balance, one or more variables are calculated by, for example, the server and sent to the client once a day. In the following definitions, S denotes space, U denotes upload bandwidth, D denotes download bandwidth and A denotes availability. Each user i knows how much data is backed up (e.g., compressed or uncompressed, before the data is streamed to the suppliers). This is represented by the variable consSi.

For each user, the server determines how much of each resource that user has supplied over the last month and what the average availability was. This information is transmitted from the server to the user once a day via the following four variables: supplySi, supplyUi, supplyDi, supplyAi.

The server knows exactly how much bandwidth was used on the supplier side (e.g., aggregated for all peers) over the last month and how much storage space is being used up on the suppliers. The following three variables denote this information: demandS, demandU, demandD. These variables are transmitted from the server to the client once a day.

The server also transmits the "time period" over which the average supply variables and the demand variables were determined or measured.

Via client software, the user controls the maximum amount of each resource that the user provides. The user sets maximum user caps on each resource that determines the following three variables: userCapSi, userCapUi, userCapDi. The user may set the userCap for each resource differently. The system determines the maximum caps that are taken into account for each resource as a function of the current user-Caps: sysCapSi, sysCapUi, sysCapDi. In general, the sysCaps are a function of the userCaps and the flexibility of the system in assigning work to different peers. For each resource combination (e.g., six combinations in total) there is a "slack factor" greater than one that is multiplied with the resource ratio determined by system-wide demand. Each of these slack factors is determined (e.g., learned) by the server over time and transmitted to the client once a day. The following is an exemplary C# implementation of the method that computes the resource balance using the parameters described herein. The object "sp" holds the variables transmitted from the server:

```
int userCapS = userSettings.MaxStorage;//in # of
fragments
int userCapU = (int)(userSettings.MaxBandwidthUp *
sp.MeasurementTimePeriod *
testAvailability / 64);//in # of fragments
int userCapD = (int)(userSettings.MaxBandwidthDown *
sp.MeasurementTimePeriod *
testAvailability / 64); //in # of fragments
double sysCapS = Math.Min(sp.slack1 * (sp.DemandStorage /
sp.DemandBandwidthUp) *
userCapU, sp.slack2 * (sp.DemandStorage /
sp.DemandBandwidthDown) * userCapD);
double sysCapU = Math.Min(sp.slack3 *
(sp.DemandBandwidthUp / sp.DemandStorage) *
userCapS, sp.slack4 * (sp.DemandBandwidthUp /
sp.DemandBandwidthDown) * userCapD);
double sysCapD = Math.Min(sp.slack5 *
(sp.DemandBandwidthDown / sp.DemandStorage) *
userCapS, sp.slack6 * (sp.DemandBandwidthDown /
sp.DemandBandwidthUp) * userCapU);
```

Once the suppliers prices $P^S_X$, all usages, all sysCaps and all userCaps have been determined, the following two values are determined in Equation (2):

$$\text{maxConsumption}_i = P_S^S(\text{userCap}P_i) \cdot \min\{\text{userCap}S_i, \text{sysCap}S_i\} + P_U^S \cdot \min\{\text{userCap}U_i, \text{sysCap}U_i\} + P_D^S \cdot \min\{\text{userCap}D_i, \text{sysCap}D_i\}$$

$$\text{avgConsumption}_i = P_S^S(\text{supply}P_i) \cdot \text{supply}S_i + P_U^S \cdot \text{supply}U_i + P_D^S \cdot \text{supply}D_i \quad (2)$$

An exemplary C# implementation is shown below.

```
double maxConsumption =
GetAdjustedPrice(sp.PriceSupplyStorage, testAvailability)
*
Math.Min(userCapS, sysCapS)
+ sp.PriceSupplyBandwidthUp * Math.Min(userCapU, sysCapU)
+ sp.PriceSupplyBandwidthDown * Math.Min(userCapD,
sysCapD);
double avgConsumption =
GetAdjustedPrice(sp.PriceSupplyStorage,
sp.CurrentAvailability)
* MySupplyStorage
+ sp.PriceSupplyBandwidthUp * MySupplyBandwidthUp
+ sp.PriceSupplyBandwidthDown * MySupplyBandwidthDown;
```

The variable $\epsilon$ denotes the ratio of these two values which represents the percentage of how much of the maximum consumption user i is currently using, as shown in Equation (3) below.

$$\varepsilon = \frac{\text{avg Consumption}}{\text{max Consumption}} \quad (3)$$

Knowing $\epsilon$, the pie chart can be drawn. The annotations are determined, in some embodiments, for the used space and the free space. For the used space, the amount of storage space that the user currently consumes is displayed. For the free space, the amount of free space is calculated as shown in Equation (4) below.

$$\text{FreeSpace} = 1/\epsilon * \text{UsedSpace} \quad (4)$$

An exemplary C# implementation is shown below.

```
double resourceRatio = maxConsumption / avgConsumption;
ResourceBalance rb = new ResourceBalance( );
rb.CurrentStorage = sp.CurrentConsumptionStorage;
rb.MaxStorage = Math.Max(sp.CurrentConsumptionStorage *
resourceRatio,
sp.CurrentConsumptionStorage);
rb.sysCapStorage = sysCapS;
rb.sysCapBandwidthUp = sysCapU;
rb.sysCapBandwidthDown = sysCapD;
return rb;
```

Handling Low Account Balances

The maximum deficit a user can take on is bounded but adaptive. The bound increases when a peer uses the system more (e.g., similar to a credit card line). However, for each user, there is a maximum bound at a pre-defined point in time. At that point, the system does not allow the user to backup any more files. Generally, a user's account balance can be in one of three states: healthy (e.g., balance close to zero or larger than zero), weak (e.g., balance quite negative, far from zero), and unhealthy (e.g., balance very far from zero, either close to the maximum deficit or equal to the maximum deficit). Handling a low account balance may be handled in one or more ways, alone or in combination. For example, when the user's account balance is weak or unhealthy, the system automatically sends an email alerting the user to increase the resource caps or to stay online longer. As another example, on the user interface, the user sees a current status in the form of a light where the colors green, orange, and red correspond to the three possible states of the account balance. As another example, next to the status light, a button is displayed for the user to click to automatically fix a bad balance (e.g., that automatically increases the resource caps proportionally to the current settings). In another example, the user selects (e.g., via checking a checkbox) that the client automatically increases the resource caps when the balance gets too low.

Work Allocation

Figure 5:
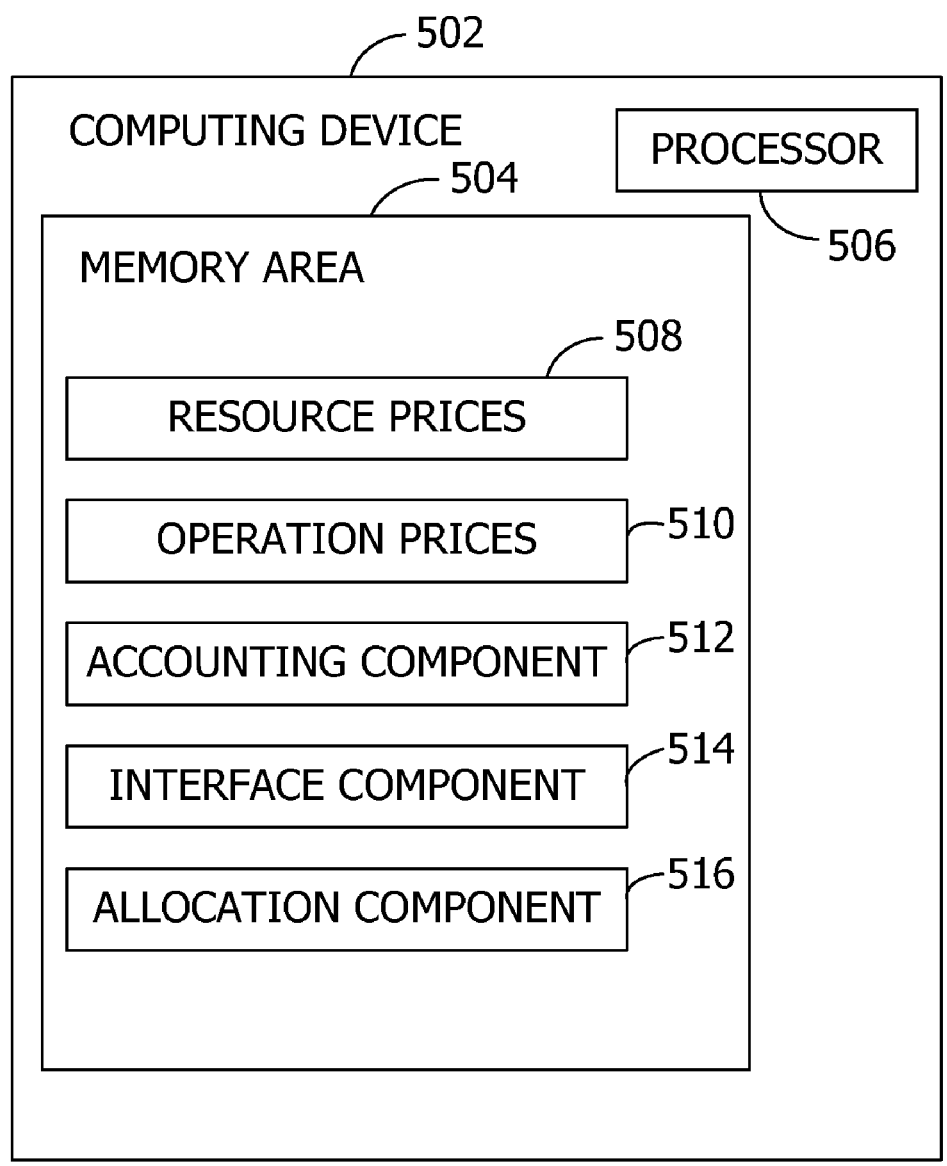
FIG. 5 is an exemplary block diagram illustrating a computing device having computer-executable components implementing aspects of the invention.

Referring next to FIG. 5, an exemplary block diagram illustrates a computing device 502 having computer-executable components implementing aspects of the invention. The computing device 502 includes a processor 506 and a memory area 504. The processor 506 is programmed to execute computer-executable instructions for implementing aspects of the disclosure. In some embodiments, the processor 506 is programmed to execute instructions such as those illustrated in the figures (e.g., FIG. 6 and FIG. 7).

In the example of FIG. 5, the memory area 504 is within the computing device 502. However, the memory area 504 or any of the data stored thereon may be associated with any server or other computer, local or remote from the computing device 502 (e.g., accessible via a network).

The memory area 504, or other computer-readable media, stores resource prices 508 for a plurality of resources in a peer-to-peer resource exchange system. The resource exchange system includes consumers and suppliers. The memory area 504 further stores operation prices 510 for operations performed by the resource exchange system. The memory area 504 also stores a value representing an amount of data to be stored by the resource exchange system (not shown). The value represents the amount of the resource consumed by the consumer. The consumer is charged based on the current prices and the amount of resources the consumers consume or the operations the consumers perform.

The memory area 504 further stores one or more computer-executable components. The components include, for example, an accounting component 512, an interface component 514, and an allocation component 516. The accounting component 512 maintains one or more tables, databases, and/or queues of resource suppliers in the resource exchange system. Each of the queues corresponds to one of a plurality of the data operations to be performed in the resource exchange system. Each of the resource suppliers has an account balance corresponding thereto. In some embodiments, the accounting component orders the resource suppliers within the plurality of the queues based on the account balance corresponding to each of the resource suppliers. For example, the system maintains a queue of peers with a negative account balance, ordered such that the peers with the most negative account balance are at the top of the queue. For example, this is determined by looking at the difference of the user's current supply of each resource and the maximum cap put on each resource. When a new request comes in, the server assigns the work to the user at the top of the queue. While described with respect to a queue, the accounting component is operable with any form of data structure for storing and ordering requests for the data operations.

The interface component 514 receives a request from the user. The request identifies at least one of the plurality of data operations to perform. The allocation component 516 identifies a plurality of the resource suppliers based at least on the data operation to perform and the account balance corresponding to each of the resource suppliers. For example, the resource suppliers may be identified based on one or more of the following: a geographical location of each of the resource suppliers, a time of day during which the resource suppliers are online, a computing system associated with each of the resource suppliers, and a network connection associated with each of the resource suppliers. In some embodiments, the allocation component 516 identifies the plurality of the resource suppliers by selecting the resource suppliers having the most negative account balances. In this manner, the allocation component 516 attempts to achieve equilibrium. For example, the server tries to allocate work to those users with the lowest account balances to drive the accounts to zero.

The interface component 514 provides the identified plurality of the resource suppliers to the user. For example, a list of the resource suppliers is provided to the user in a user interface. The user selects at least one of the identified resource suppliers (e.g., to supply resources which are used to produce the operations that are then consumed by the user).

In operation, for each operation, the server either gets to directly choose which peers act as suppliers or at least gets to suggest a list of potential suppliers. For backup operations, the server sends a list of peers to the consumer. The consumer contacts peers from that list to serve as suppliers for the backup operation. For storage operations, peers that received fragments in the backup operation serve as peers for the storage operation. For retrieval operations, the server sends a list of peers that have stored relevant fragments to the consumer. The consumer contacts peers from that list to serve as suppliers for the retrieval operation. For the testing operations, the server decides which peer downloads the fragment to be tested. For the repair operations, the server decides which peer downloads the fragments to be reconstructed. That peer receives a list of peers that are holding fragments of the file and the peer contacts peers from that list for the repair operation.

Each operation in the market transfers credits from consumers to suppliers and potentially transfers some tax credits from consumers to the server. Because the users start out with a zero account balance, the sum of the account balances equals zero. For every user who has a positive account balance, at least one other user has a negative account balance. Over time, the balances are driven to approximately zero to so that the users can continue using the system (e.g., have enough credits to pay for new consumptions).

Determining Operation and Resource Prices

Figure 6:
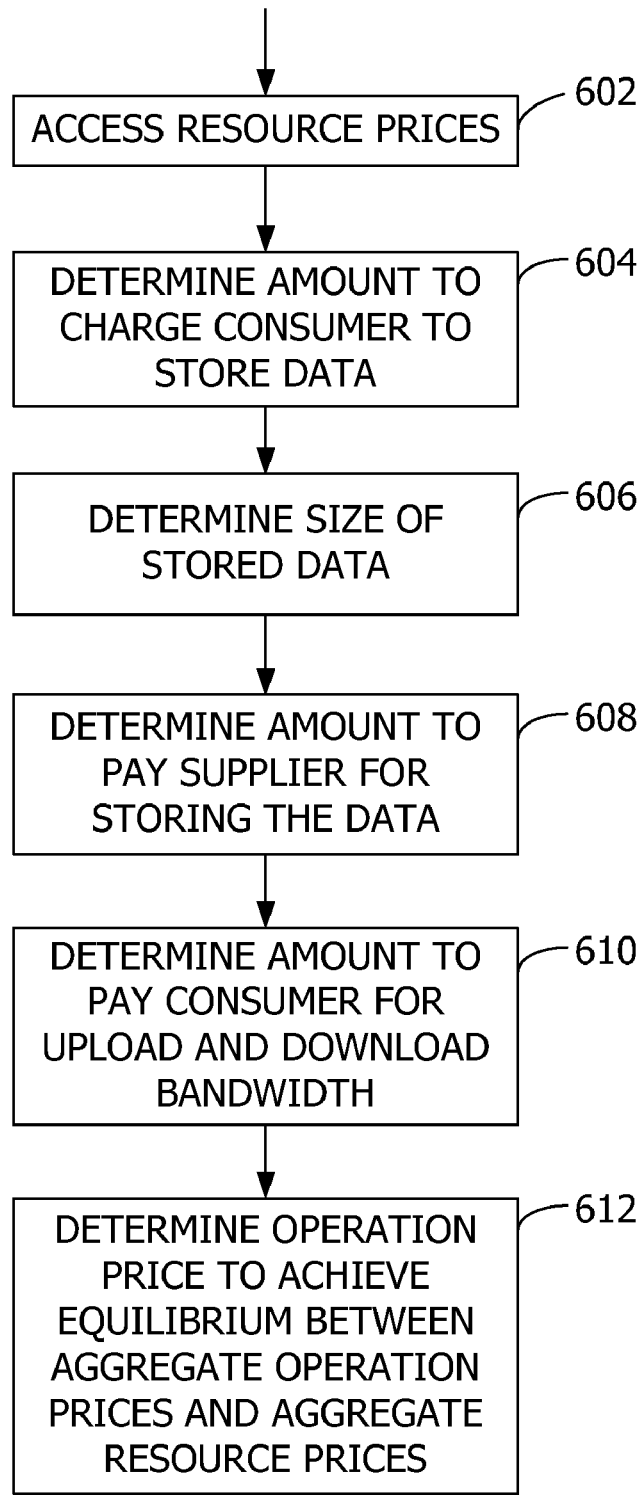
FIG. 6 is an exemplary flow chart illustrating determination of prices for operations to achieve equilibrium between operations prices and resource prices.

Referring next to FIG. 6, an exemplary flow chart illustrates determination of prices for operations to achieve equilibrium between operations prices and resource prices. In the example of FIG. 6, the resource is storage space. However, the operations illustrated in FIG. 6 are applicable when exchanging other resources such as computation or bandwidth.

At 602, the resource prices and the size of the data to be stored by the resource exchange system are accessed. At 604, an amount to charge one of the consumers for at least one of the operations is determined based at least on the size of the data to be stored and the operation price corresponding to the operations. The data from the consumer is stored in the resource exchange system. At 606, a size of the data stored by the resource exchange system is determined. As described herein, the size of the data actually stored by the resource exchange system is greater than the size of the data to be stored by the resource exchange system (e.g., provided by the consumer).

At 608, an amount to pay the supplier(s) to perform the operation is determined based at least on the determined size of the stored data. At 610, an amount to pay the consumer for use of the consumer's resources (e.g., upload and download bandwidth) is determined based on the determined size of the data stored.

At 612, an operation price for each of the operations is determined such that a total of the operation prices for operations performed by the resource exchange system equals a total of the resource prices for the supplied resources. The determination at 602 is performed based on, for example, the determined amount to pay the consumer and the determined amount to pay the supplier(s). In the example of FIG. 6, the system makes neither a profit nor a loss. In other embodiments, the system charges a tax or other fee on operations to allow the system to make a profit over time. In such embodiments, the operation prices and the resource prices are adjusted to generate a profit for the resource exchange system, as described herein.

The determined amount to pay the suppliers and the determined amount to pay the consumer are represented by credits internal to the resource exchange system. In some embodiments, a conversion rate (e.g., stored by the memory area 504) defines the relationship between the credits and currency external to the resource exchange system. In this manner, consumers can buy resources with dollars instead of bartering resources. Similarly, consumers can earn dollars by offering resources.

In some embodiments, each of the operations has an operation type associated therewith. Aspects of the disclosure balance the operation prices with the resource prices for each operation type. For example, the resource exchange system determines the operation price for each of the operations of a same operation type such that the total of the operation prices for performed operations of the same operation type equals the total of the resource prices for the supplied resources.

The payments may be instantaneous, continuous, or daily. For example, the user can be paid a) immediately after an operation finished, b) once a day, or c) in the middle of ongoing operations (e.g., when partial logs about the operation are reported to the server). For backup and retrieval operations, the user may be paid immediately after the operation has finished. For storage operations, the user may be paid once a day.

Examples and a further description of FIG. 6 are next described. The original file size (e.g., k fragments) is known to the server as well as the backed up file size (e.g., measured in fragments, n). The users are charged for all operations based on k and paid based on n. To determine n, the peer reports where the fragments are stored to the server after a backup operation completes so that the user will be able to retrieve the fragments when appropriate. However, k is simply reported from the user to the server. To prevent fraud, when a backup completes, a heuristic check may be performed to determine whether the n and k have an unreasonable ratio. In addition, when a user retrieves a backup and requests significantly more than k decryption keys from the server, this is an indication of possible fraud. If either fraud prevention test is positive, the server asks a peer to reconstruct the file based on the number of fragments stored on the suppliers to determine whether k was reported truthfully or not.

The ratio of n to k can vary significantly from backup to backup because of the different availabilities of the peers that the consumer happens to get as suppliers (and that are currently online). As such, embodiments of the invention pay the consumer for the usage of the user's resources (e.g., upload bandwidth for a backup operation and download bandwidth for a retrieval operation). In such embodiments, the consumer pays for an operation based on an original file size k. The consumer is paid for the usage of the consumer's resources involved in the operation, based on n. The suppliers are paid for the usage of their resources based on n. The payments back to the consumer as treated as paying the supplier. Thus, for a backup operation, the suppliers are paid for their download bandwidth and the consumer is paid for upload bandwidth. Even though the consumer is paid for using the consumer's resources, the total payment for an operation is generally positive.

If the consumer uses low-availability peers in a backup operation and is thus paid a large amount for the usage of the consumer's resources, the systems reacts by assigning less work (e.g., testing or repair work) to that same consumer in the future.

An example of a perfectly balanced pricing system (e.g., no profit or loss) is next described.

TABLE 3

Example notation for resource and operation prices.

| | |
|---|---|
| $p_S$ | The price for storage. |
| $p_U$ | The price for upload bandwidth |
| $p_D$ | The price for download bandwidth |
| $p_B$ | The price for a backup operation. |
| $p_{SO}$ | The price for a storage operation. |
| $p_R$ | The price for a retrieval operation. |
| $k^B_i$ | The number of fragments of the files that user i backed up. |
| $k^R_i$ | The number of fragments of the files that user i retrieved. |
| $k^S_i$ | The number of fragments of the files that are stored for user i. |
| $n^S_i$ | The number of fragments user i stored. |
| $n^U_i$ | The number of fragments user i uploaded. |
| $n^D_i$ | The number of fragments user i downloaded |

The variables are measured over the time period of one day, in some embodiments. At the end of the day, the system charges users, makes payments and updates the account balances. The consumer is charged as shown in Equation (5).

$$k_i^B \cdot p_B + k_i^R \cdot p_R + k_i^S \cdot p_{SO} \qquad (5)$$

The supplier is paid as shown in Equation (6).

$$n_i^U \cdot p_U + n_i^D \cdot p_D + n_i^S \cdot p_S \cdot \text{adjust}(a_i) \qquad (6)$$

The price for storage is adjusted for each user according to that user's availability. The lower the user's availability the less the system pays per fragment stored. For example, the adjustment may simply be a multiplication with that user's availability. However, because the relationship between the user's contribution and the user's availability is not linear, a look-up table for adjustment factors may be employed. For each availability, the table provides an adjustment factor (e.g., less than 1).

The resource prices pD, pU and pS are market prices and updated regularly. Aspects of the invention determine the operation prices pB, pR and pSO such that the aggregate resource cost equals the aggregate operation cost. An exemplary balance equation is shown in Equation (7) below.

$$\Sigma_i k_i^B \cdot p_B + k_i^R \cdot p_R + k_i^S \cdot p_{SO} = \Sigma_i n_i^U \cdot p_U + n_i^D \cdot p_D + n_i^S \cdot p_S \cdot \text{adjust}(a_i) \qquad (7)$$

From Equation (7), to balance the left and right side, the corresponding aggregate values are considered. The following three variables are defined for the consumer side in Equations (8), (9), and (10).

$$K_B = \Sigma_i k_i^B \qquad (8)$$

$$K_R = \Sigma_i k_i^R \qquad (9)$$

$$K_S = \Sigma_i k_i^S \qquad (10)$$

The following three variables are defined for the supplier side in Equations (11), (12), and (13).

$$N_U = \Sigma_i n_i^U \quad (11)$$

$$N_D = \Sigma_i n_i^D \quad (12)$$

$$N_S^a = \Sigma_i n_i^S \cdot \text{adjust}(a_i) \quad (13)$$

The balance equation may be rewritten as shown in Equation (14).

$$K_B \cdot p_B + K_R \cdot p_R + K_S \cdot p_{SO} = N_U \cdot p_U + N_D \cdot p_D + N_S^a \cdot p_S \quad (14)$$

The balancing equation in Equation (14) includes choices for how to price the operations (e.g., backup, storage and retrieval). In some embodiments, the prices balance per operation type. The amount charged to consumers for a particular type of operation equals the amount paid to suppliers for that type of operation. For example, when pricing the backup operation, the current market prices for upload and download bandwidth, and how much bandwidth was actually consumed and supplied for all backup operations are considered.

To price individual operations, aspects of the disclosure further differentiate for the supply variables for which operation each resource was used. The variable B is for backup, R is for retrieval, and T/R is for testing and repair, as shown in Equation (15) and (16) below.

$$N_U = N_{U,B} + N_{U,R} + N_{U,T/R} \quad (15)$$

where $N_{U,B}$ is the number of fragments that all users uploaded for backup operations, $N_{U,R}$ is the number of fragments that all users uploaded for retrieval operations, and $N_{U,T/R}$ is the number of fragments that all users uploaded for testing or repair operations.

$$N_D = N_{D,B} + N_{D,R} + N_{D,T/R} \quad (16)$$

where $N_{D,B}$ is the number of fragments that all users downloaded for backup operations, $N_{D,R}$ is the number of fragments that all users downloaded for retrieval operations, and $N_{D,T/R}$ is the number of fragments that all users downloaded for testing/repair operations.

In some embodiments, $N_{U,B} = N_{D,B}$. The number of fragments that were uploaded for backup operations equals the number of operations that were downloaded for backup operations. The analogous equivalence holds true for the retrieval operation: $N_{U,R} = N_{D,R}$ and for testing and repair $N_{U,T/R} = N_{D,T/R}$. Equations (17), (18), (19), and (20) are shown below.

$$N_B = N_{U,B} = N_{D,B} \quad (17)$$

$$N_R = N_{U,R} = N_{D,R} \quad (18)$$

$$N_{T/R} = N_{U,T/R} = N_{D,T/R} \quad (19)$$

$$N_S = N_S^a = \Sigma_i n_i^S \cdot \text{adjust}(a_i) \quad (20)$$

For a backup operation, the price is determined as shown in Equation (21) below.

$$K_B \cdot p_B = N_{U,B} \cdot p_U + N_{D,B} \cdot p_D \quad (21)$$
$$\Leftrightarrow K_B \cdot p_B = N_B \cdot (p_U + p_D)$$
$$\Leftrightarrow p_B = \frac{N_B}{K_B} \cdot (p_U + p_D)$$

For a retrieval operation, the price is determined as shown in Equation (22) below.

$$K_R \cdot p_R = N_{U,R} \cdot p_U + N_{D,R} \cdot p_D \quad (22)$$
$$\Leftrightarrow K_R \cdot p_R = N_R \cdot (p_U + p_D)$$
$$\Leftrightarrow p_R = \frac{N_R}{K_R} \cdot (p_U + p_D)$$

For the retrieval operation, the number of fragments of the file the consumer wants to download and the number of fragments that the suppliers supply are almost equal.

For a store operation, continuous costs are taken into account (e.g., storage, periodic testing and periodic repair), as shown in Equation (23) below.

$$K_S \cdot p_{SO} = N_S \cdot p_S + N_{T/R} \cdot (p_U + p_D) \quad (23)$$
$$\Leftrightarrow p_{SO} = \frac{N_S}{K_S} \cdot p_S + \frac{N_{T/R}}{K_S} \cdot (p_U + p_D)$$

In embodiments in which a tax is charged, the following amount is charged and the payments to the suppliers are left unchanged, as shown in Equation (24).

$$k_i^B \cdot p_B \cdot (1 + tax_B) + k_i^R \cdot p_R \cdot (1 + tax_R) + k_i^S \cdot p_{SO} \cdot (1 + tax_S) \quad (24)$$

The additional income is paid to the server's account, as shown in Equation (25) below.

$$k_i^B \cdot p_B \cdot tax_B + k_i^R \cdot p_R \cdot tax_R + k_i^S \cdot p_{SO} \cdot tax_S \quad (25)$$

The server's profit is shown in Equation (26) below.

$$K_B \cdot p_B \cdot tax_B + K_R \cdot p_R \cdot tax_R + K_S \cdot p_{SO} \cdot tax_S \quad (26)$$

In general, the tax variables can be chosen arbitrarily from $[-1, \infty]$. A negative tax corresponds to a subsidization of the market, e.g., the server is pumping money into the market that may occur to attract customers. The higher the tax, the more costly are the individual operations for the consumers. The consumers have to supply more of their own resources in return for their consumption.

While the taxing system allows perfect balancing (e.g., the sum of all user account balances plus the server's account balance equals zero), it is not too rigid for the server to react to certain demands on a secondary market spontaneously. In particular, the server does not have to first charge taxes for a while before the tax revenue can be used to buy services and sell them on the secondary market. Instead, the server may take on a deficit. Thus, at any point in time, the server can act as a regular consumer, initiate operations (e.g., backup for a user from a secondary market), and pay for operations. If the server does not have enough credits on the server's account balance, the balance becomes negative.

In some embodiments, user accounts are not updated for 24 hours. Thus, if the user has a negative balance, it remains negative for 24 hours even if that user has already done much more work than needed to get the balance into the positive area. The same holds true for the user who has a positive balance and starts consuming. The server does not assign any work to that user for 24 hours (e.g., before the account is updated and the server notices that it is negative). In such embodiments, a temporary balance is maintained. Every time the user's account balance is updated, the temporary balance is set equal to the real balance. Then, during the day, after an operation is finished, the user's temporary balance is immediately updated using the last set of prices calculated. This puts the user who has done a lot of work out of the supplier queue and the user who has been consuming a lot into the supplier queue. In some embodiments, within one day the temporary balance and the regular account balance do not diverge too much such that the work allocation method can be based on the temporary balance.

Price Updates

Figure 7:
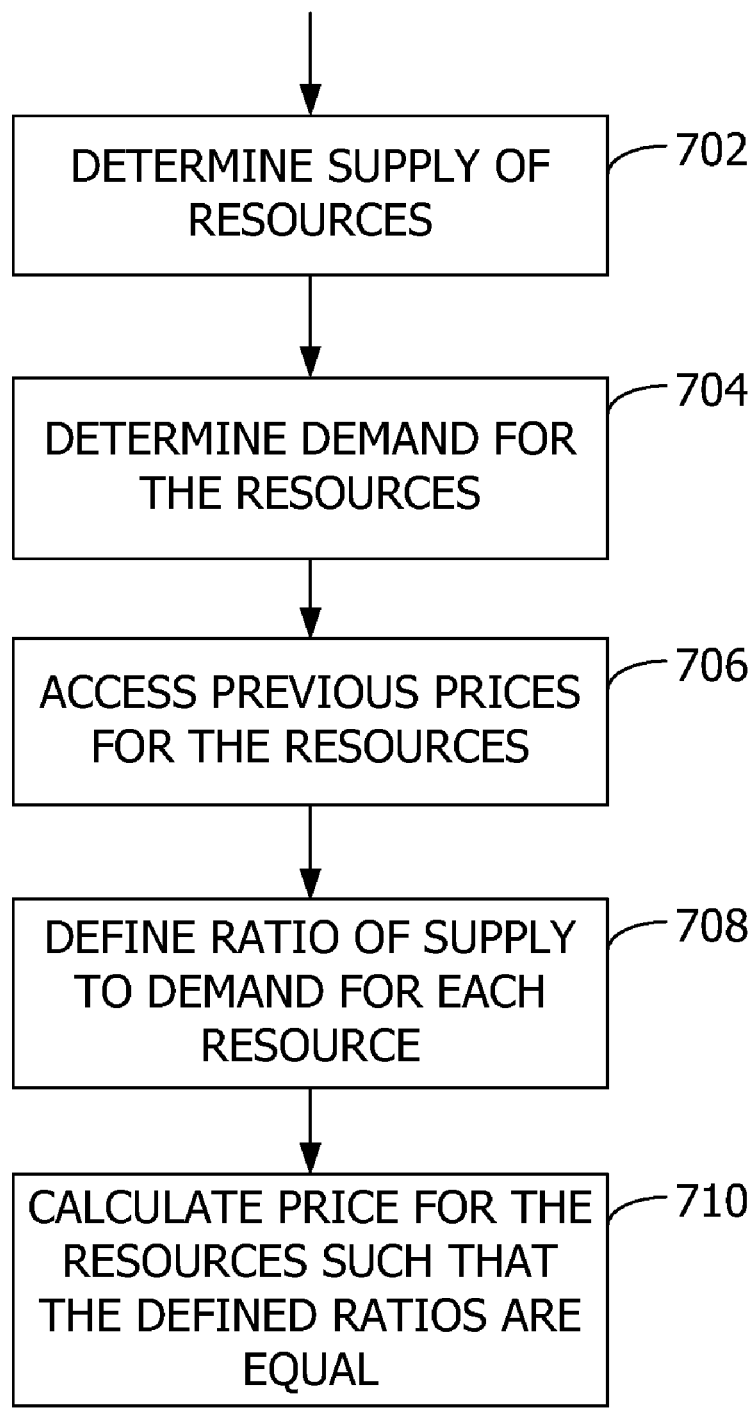
FIG. 7 is an exemplary flow chart illustrating determination of price updates for the resources.

Referring next to FIG. 7, an exemplary flow chart illustrates determination of price updates for the resources. At 702, a supply of the resources is determined. At 704, a demand for each of the resources is determined. At 706, a plurality of previous prices for the resources is accessed. At 708, a ratio of the determined supply to the determined demand is defined for each of the resources. At 710, the resource price for each of the resources is calculated based on the accessed prices and defined ratios. The resource prices are calculated such that the defined ratios for each of the resources are equal.

In an example operation, the market prices for the resources (e.g., storage, upload, and download bandwidth) are updated when the supply and demand changes. The following notation is shown for the three prices: pS represents the price for storage, pU is the price for upload bandwidth, and pD is the price for download bandwidth. The whole price vector is represented as $\vec{p}$ as shown in the Equation (27) below.

$$\vec{p} = (p_S, p_U, p_D) \quad (27)$$

Aspects of the disclosure measure user i's usage of a resource X via the variable supplyXi. The total demand in the system for resource X is the sum of the users' supply of that resource. The maximum amount of resource X that user i is willing to supply is captured via the variable sysCapXi. The system-wide supply of resource X is thus the sum of all sysCaps. Thus, the system-wide notions of supply and demand given a particular price vector $\vec{p}$ are described in the following Equations (28) and (29).

$$\text{Demand: } d_X(\vec{p}) = \Sigma_i \text{supply } X_i(\vec{p}) \quad (28)$$

$$\text{Supply: } s_X(\vec{p}) = \Sigma_i \text{sysCap} X_i(\vec{p}) \quad (29)$$

In some embodiments, the aggregate demand function is generally price-inelastic. That is, the consumer behavior does not change significantly as prices change, while the aggregate supply function is price elastic. That is, as resource prices change, the users change their user caps and thus aggregate supply changes.

The aggregate supply function is relatively price-elastic. In some embodiments, a significant subset of users has a price-elastic supply function. The users adjust their resource caps when prices change. For this to happen, the user opens a settings tab in the user interface, moves the individual sliders to see the current market prices, and then adjust the sliders to a new position, according to the current price vector.

Price changes influence supply. When prices increase for one resource, the supply of that resource goes up and the supply of the other resources goes down (e.g., the gross substitutes condition). When prices are updated, the buffer for some resources increases and decreases for others. Aspects of the disclosure maximize the minimum buffer between supply and demand for any resource. An equilibrium, in some embodiments, is the price vector $\vec{p}$, an aggregate supply vector $s(\vec{p})=s_S(\vec{p}),s_U(\vec{p}),s_D(\vec{p})$, and aggregate demand $d(\vec{p})=d_S(\vec{p}),d_U(\vec{p}),d_D(\vec{p})$ such that equilibrium occurs as shown in Equation (30) below. The buffer between aggregate demand and aggregate supply is the same for each resource.

$$\frac{s_S(\vec{p})}{d_S(\vec{p})} = \frac{s_U(\vec{p})}{d_U(\vec{p})} = \frac{s_D(\vec{p})}{d_D(\vec{p})} \quad (30)$$

Instead of searching for the equilibrium price vector in three dimensions (e.g., $R^3$), aspects of the disclosure look at the projective space $R\mathbb{P}^2$ as shown in Equation (31) below.

$$RP^2 := ((p_S, p_U, p_D) \in R^3 \setminus \{0\})/\sim,$$

$$\text{with } (p_S, p_U, p_D) \sim \lambda(p_S, p_U, p_D) \, \forall \lambda \in R^+ \quad (31)$$

If the price of one arbitrary good (e.g., the numeraire) is fixed at one, and the price of storage space is set to one, the price vector may be represented with homogenous coordinates as shown in Equation (32) below.

$$\vec{p} = (p_S, p_U, p_D) \sim \left(1, \frac{p_U}{p_S}, \frac{p_D}{p_S}\right) \sim [p_S : p_U : p_D] \quad (32)$$

Aspects of the disclosure find prices such that the supply vector is a multiple of the demand vector, i.e., $s(\vec{p})=\lambda d(\vec{p})$ for any $\lambda \in R^+$. Thus, to find equilibrium prices, the projective space for the aggregate supply and demand vectors is analyzed. In affine space, the supply vector is a multiple of the demand vector (see Equation (33) below). In projective space, the supply vector equals the demand vector.

$$\exists \lambda \in R^+ : \begin{pmatrix} s_S \\ s_U \\ s_D \end{pmatrix} = \lambda \begin{pmatrix} d_S \\ d_U \\ d_D \end{pmatrix} \quad (33)$$

If the supply and demand of storage space is normalized to one, the following Equation (34) applies.

$$\exists \lambda' \in \Re^+ : \begin{pmatrix} 1 \\ \frac{s_U}{s_S} \\ \frac{s_D}{s_S} \end{pmatrix} = \lambda' \begin{pmatrix} 1 \\ \frac{d_U}{d_S} \\ \frac{d_D}{d_S} \end{pmatrix} \quad (34)$$

The above Equation (34) is true for $\lambda'=1$. In $R\mathbb{P}^2$ the following Equation (35) applies.

$$\begin{pmatrix} \frac{s_U}{s_S} \\ \frac{s_D}{s_S} \end{pmatrix} = \begin{pmatrix} \frac{d_U}{d_S} \\ \frac{d_D}{d_S} \end{pmatrix} \quad (35)$$

$$\Leftrightarrow \begin{pmatrix} \frac{s_U}{s_S} \\ \frac{s_D}{s_S} \end{pmatrix} - \begin{pmatrix} \frac{d_U}{d_S} \\ \frac{d_D}{d_S} \end{pmatrix} = 0$$

A vector-valued function $f(\vec{p})=f_1(\vec{p}), f_2(\vec{p})$ is created such that Equations (26) and (27) below apply.

$$f_1(\vec{p}) = \left(\frac{s_U(\vec{p})}{s_S(\vec{p})} - \frac{d_U(\vec{p})}{d_S(\vec{p})}\right) \quad (36)$$

$$f_2(\vec{p}) = \left(\frac{s_D(\vec{p})}{s_S(\vec{p})} - \frac{d_D(\vec{p})}{d_S(\vec{p})}\right) \quad (37)$$

Using the projective spaces for the price vector and the supply and demand vectors, an equilibrium function is defined as the price vector $\vec{p}$ and $f(\vec{p})$ such that Equation (38) applies.

$$f(\vec{p}) = \begin{pmatrix} 0 \\ 0 \end{pmatrix} \quad (38)$$

Thus, to find equilibrium prices, aspects of the disclosure find the root of the function $f(\vec{p})$.

An exemplary price update rule may be defined based on the definition of the Secant method for a one-dimensional function $f$ as shown below in Equation (39).

$$x_{n+1} = x_n - \frac{x_n - x_{n-1}}{f(x_n) - f(x_{n-1})} \cdot f(x_n) \quad (39)$$

Generalizing the secant method to multiple dimensions, Equation (40) listed below is applicable.

$$p_X^{t+1} = \begin{cases} 1 & \text{for } X = S \\ p_X^t - \frac{p_X^t - p_X^{t-1}}{f_X(\vec{p}^t) - f_X(\vec{p}^{t-1})} \cdot f_X(\vec{p}^t) & \text{for } X = U, D \end{cases} \quad (40)$$

In some embodiments, the following three cases as shown by Equations (41), (42), and (43) may apply.

$$f_X(\vec{p}^{t+1}) = f_X(\vec{p}^t) \quad (41)$$

In Equation (41), the difference between the buffers happened to stay the same.

$$f_X(\vec{p}^t) = 0 \quad (42)$$

In Equation (42), the equilibrium was reached.

$$p_X^{t+1} = p_X^t \quad (43)$$

In Equation (43), the price for good X stayed the same for two iterations.

Over time, demand can change and prices that were previously in equilibrium are no longer in equilibrium. Thus, the price update rule can get out of equilibrium again. A very small wiggle parameter $\epsilon > 0$ is inserted into the price update rule. In these cases, the modified price update rule for the cases is shown in Equation (44) below.

$$p_X^{t+1} = p_X^t - \frac{p_X^t - p_X^{t-1} + \varepsilon}{f_X(\vec{p}^t) - f_X(\vec{p}^{t-1})} \cdot (f_X(\vec{p}^t) + \varepsilon) \text{ for } X = U, D \quad (44)$$

An example of the price update rule in operation is described in Appendix A.

Pricing Ongoing Operations

Figure 8:
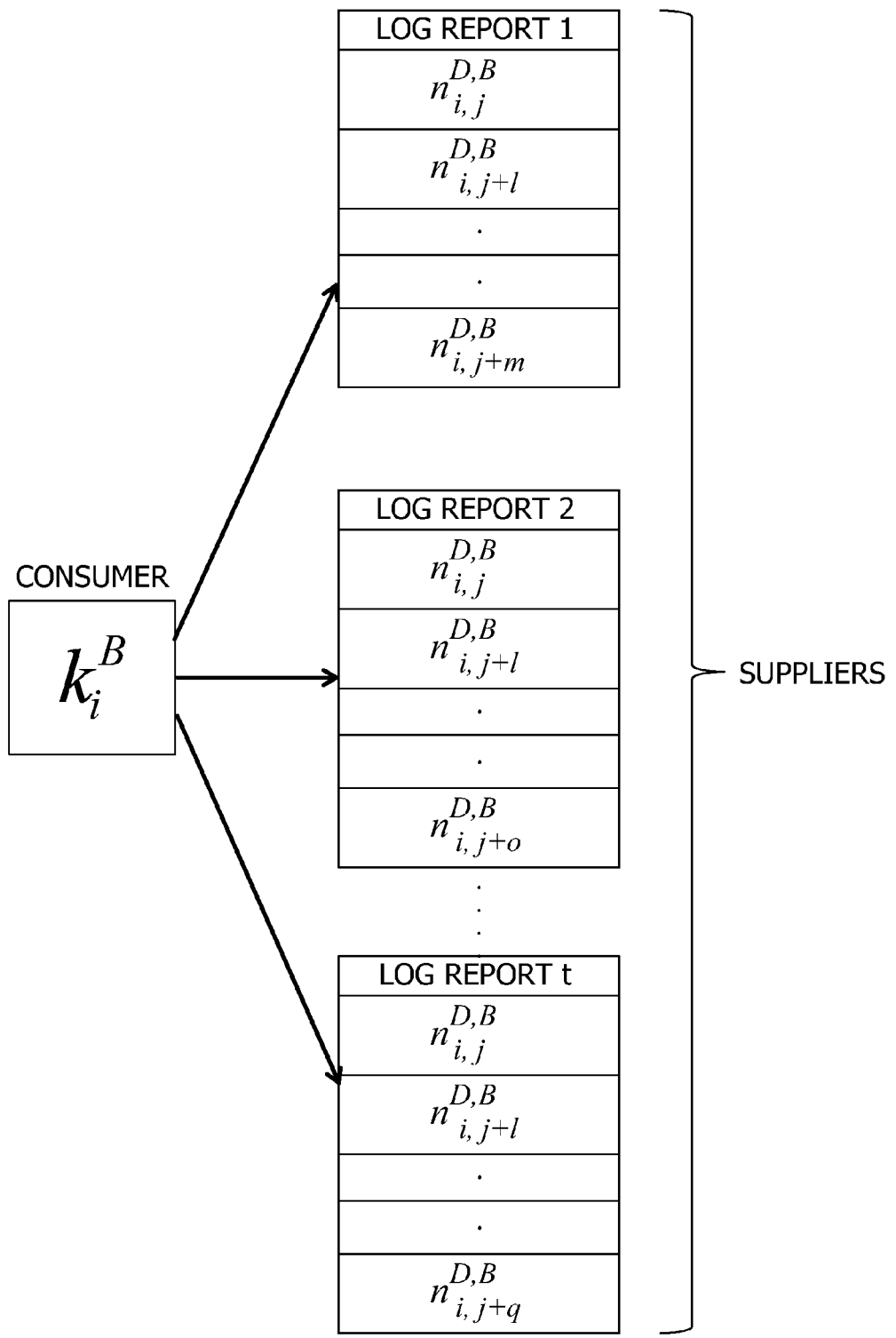
FIG. 8 is an exemplary block diagram illustrating splitting of operations.

Referring next to FIG. 8, an exemplary block diagram illustrates splitting of operations. When the consumer initiates a backup, the consumer reports the size of the file (e.g., ki). If the consumer initiates a retrieval, the server already knows ki. The consumer is charged for operations based on ki.

In some embodiments, each ticket that the consumer gets from the server has a 24-hour time limit. Thus, within 24 hours, the consumer reports to which peers fragments (backup) have been sent or from which peers fragments have been received, even if the consumer has not yet finished the operation. After the consumer reports a new log to the server, the bandwidth used according to the current set of prices is priced, and the temporary account balances are updated.

Whenever the pricing mechanism is performed and a new set of prices is computed, partial operations from the last 24 hours including those that involve storage are priced and the temporary account balances are set to the real account balances again. Suppliers are paid for ongoing operations because the quantity of supplied fragments is known. To charge the consumer, the fraction of the file corresponding to the quantity of fragments already uploaded/downloaded is estimated using the ratios shown in Equation (45) below from the previous pricing iteration.

$$\frac{N_B^t}{K_B^t}, \frac{N_R^t}{K_R^t} \text{ and } \frac{N_S^t}{K_S^t} \quad (45)$$

These ratios are computed from operations that have completely finished (e.g., the server knows the true final values of each ki and ni).

Exemplary mechanisms for pricing ongoing backup, retrieval, and storage operations are shown in Appendix B.

Alternative Market Embodiments

The embodiments herein are described within a setting where no monetary trades are made. Aspects of the disclosure, however, are also applicable in other markets. For example, aspects of the disclosure are operable in closed virtual currency market, a virtual currency market with a secondary market, half-open virtual currency market with fixed buy-in prices and a secondary market, half-open virtual currency market with floating buy-in prices and a secondary market, and full market economy with a secondary market.

In the closed virtual currency market, resources are exchanged, but no real money flows into or out of the system. Any user who consumes resources also supplies resources. Trades are done with virtual currency called "credits".

In the virtual currency market with a secondary market, the system charges a "tax" on all trades and accumulates credits. Those credits are used to sell backup services on a secondary market (e.g., to users who are not direct customers of the system, for real money at a price that is determined by the system).

Exemplary Operating Environment

While aspects of the invention are described with reference to the computing device, embodiments of the invention are operable with any computing device. For example, aspects of the invention are operable with devices such as laptop computers, gaming consoles (including handheld gaming consoles), hand-held or vehicle-mounted navigation devices, portable music players, a personal digital assistant, an information appliance, a personal communicator, a handheld television, or any other type of electronic device.

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for handling a low account balance of the consumers, and exemplary means for calculating the operation prices and the resource prices.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Listed below is an example of the price update rule.

Let the supply of storage be $S_S=23*10^3$, the units of these quantities does not matter for this computation (you can assume that it is GB for storage, Mbps for upload and download bandwidth). Let the demand of storage be $D_S=5*10^3$.

Let the supply of upload bandwidth be $S_U=5*10^9$ and the demand of upload bandwidth be $D_U=25*10^9$.

Let the supply of download bandwidth be $S_D=25*10^9$ and the demand of download bandwidth be $D_D=2*10^9$.

The demand function for upload bandwidth at the current time be $$g_U^t = \frac{S_U}{S_S} - \frac{D_U}{D_S} = \frac{5*10^9}{23*10^3} - \frac{2*10^9}{5*10^3} = -182608.7,$$

and similarly the demand function for download bandwidth $$g_D^t = \frac{S_D}{S_S} - \frac{D_D}{D_S} = \frac{25*10^9}{23*10^3} - \frac{2*10^9}{5*10^3} = 686956.522$$

Also, let us assume that in the previous time unit the excess demand function for upload bandwidth $g_u^{t-1}=-365217$ and the excess demand function for download was $g_D^{t-1}=1373913$.

Also, we obtain the prices for the previous two time units: the price of storage is fixed at one. Say that price of upload bandwidth was $p_U^t=0.30$ and $p_U^{t-1}=0.25$ and the price of the download bandwidth at the previous two time units was $p_D^t=0.04$ and $p_D^{t-1}=0.05$.

Then the price update rule states that the new price of upload bandwidth is $$p_U = p_U^t - \frac{p_U^t - p_U^{t-1}}{g_U^t - g_U^{t-1}} g_U^t.$$

Substituting the quantities, this turns out to be 0.35.

The price update rule states that the new price of download bandwidth is $$p_D = p_U^t - \frac{p_D^t - p_D^{t-1}}{g_D^t - g_D^{t-1}} g_D^t.$$

Substituting the quantities, this turns out to be 0.05. For simplicity, $\epsilon=0$, which means the system is not yet in equilibrium prices. As such, the new price of upload bandwidth is 0.35, and the new price of download bandwidth=0.05. The price of storage remains the same.

APPENDIX B

Listed below are example mechanisms for pricing ongoing operations.

Backup Operation

Temporary Pricing: Adjusting Temporary Account Balances (after every log report for an individual file):

$n_{i,j}^B$: The # of fragments consumer i has backed up to supplier j according to this log report.

We temporarily pay each supplier j: $n_{i,j}^B \cdot p_D^t$

We temporarily charge the consumer i:

$$\sum_j n_{i,j}^B \cdot \frac{K_B^t}{N_B^t} \cdot p_B^t$$

We temporarily pay the consumer for his supplier role:
$\Sigma_j n_{i,j}^B \cdot p_U^t$ These temporary payments/charges go to the temporary accounts, and obviously won't balance.

Final Pricing Adjusting Real Account Balances (every 24 h):

The price update rule computed a new price vector $$\vec{p}^{\,t+1} = (p_S^{t+1}, p_U^{t+1}, p_D^{t+1})$$

$\overline{k_i^B}$: The total file size of all backups that consumer i completed in the last 24 h.

$$K_B^{t+1} = \Sigma_i \overline{k_i^B}$$

$\overline{n_i^B}$: The total number of fragments supplier i received (over the last x days) for backup operations that completed during the last 24 h.

$$N_B^{t+1} = \Sigma_i \overline{n_i^B}$$

$n_{i,j}^B$: The # of fragments consumer i has backed up to supplier j in the last 24 h.

$$\hat{k}_i^B = \sum_j n_{i,j}^B \cdot \frac{K_B^{t+1}}{N_B^{t+1}}$$

estimating the original file size of all backups from consumer i in the last 24 h.

$$N_{U,B}^* = N_{D,B}^* = \Sigma_i \Sigma_j n_{i,j}^B$$

The new balance equation is:

$$K_B^* \cdot p_B^{t+1} = N_{U,B}^* \cdot p_U^{t+1} + N_{D,B}^* \cdot p_D^{t+1}$$
$$\Leftrightarrow K_B^* \cdot p_B^{t+1} = N_B^*(p_U^{t+1} + p_D^{t+1})$$
$$\Leftrightarrow p_B^{t+1} = \frac{N_B^*}{K_B^*}(p_U^{t+1} + p_D^{t+1})$$

We pay each supplier as before (dependent on the true number of fragments)

We charge each consumer: $\hat{k}_i^B \cdot p_B^{t+1}$

Retrieval Operation

The retrieval operation works analogously to the backup operation.

Storage Operation

Temporary Pricing: we do not do temporary pricing for storage operations.

Final Pricing:

The price update rule computers a new price vector $$\vec{p}^{\,t+1} = (p_S^{t+1}, p_U^{t+1}, p_D^{t+1})$$

$k_i^S$ is the total size of the files consumer i has backed up, where the backup operation has already completed and where the files are still stored in the system.

$n_{i,j}^S$: The # of fragments consumer i has backed up to supplier j but where the backup operation has not yet finished.

$$\hat{k}_i^S = \sum_j n_{i,j}^S \cdot \frac{K_S^t}{N_S^t}$$

an estimated fraction of the files whose backup operation is still ongoing.

$K_S^* = \Sigma_i(k_i^S + \hat{k}_i^S)$ the total number of fragments (or partial fragments) we include in the pricing $N_S^*$ the number of fragments currently stored on the suppliers (backed up at any time, not just in the last 24 h), now including fragments from unfinished backup operations.

$N_{T/R}^*$ the number of fragments that were uploaded (=downloaded) in the last 24 h for testing or retrieval operations.

The new balance equation is:

$$K_S^* \cdot p_{SO}^{t+1} = N_S^* \cdot p_S^{t+1} + N_{T/R}^* \cdot (p_U^{t+1} + p_D^{t+1})$$
$$\Leftrightarrow p_{SO}^{t+1} = \frac{N_S^*}{K_S^*} \cdot p_S^{t+1} + \frac{N_{T/R}^*}{K_S^*} \cdot (p_U^{t+1} + p_D^{t+1})$$

We charge each consumer $(k_i^S + k_i^S) \cdot p_{SO}$

The element that we introduced is $K_O^*$, i.e., an estimate regarding how much of ongoing operation O has already completed. This estimate is inserted into the pricing equation such that it is forced to balance out:

We now charge the consumer: $k_i^B \cdot p_B + k_i^R \cdot p_R + (k_i^S + k_i^S) \cdot p_{SO}$ We now pay the supplier: $n_i^U \cdot p_U, n_i^D \cdot p_D + n_i^S \cdot p_S \cdot \text{adjust}(a_i)$ (finished+unfinished operations)

New Balance Equation:

$$K_B^* \cdot p_B + K_R^* \cdot p_R + K_S^* \cdot p_{SO} = N_U^* \cdot p_U + N_D^* \cdot p_D + N_S^* \cdot p_S$$

What is claimed is:

1. A system for pricing resources in a peer-to-peer resource exchange system, said system comprising:
    a memory area storing resource prices for a plurality of resources in a peer-to-peer resource exchange system, said resource exchange system including consumers and suppliers, said memory area further storing a first value representing an amount of at least one resource of at least one of the suppliers for consumption by one of the consumers, said memory area further storing operation prices for operations performed by the resource exchange system; and
    a processor programmed to:
        access, from the memory area, the resource prices and the first value;
        determine an amount to charge said one of the consumers for at least one of the operations based at least on the first value and an operation price corresponding to said at least one of the operations;

enable said at least one resource of at least one of the suppliers to be consumed by said one of the consumers;

determine a second value representing an amount of said at least one resource of at least one of the suppliers consumed by said one of the consumers;

determine an amount to pay said one of the consumers for one or more resources associated therewith based on the determined second value;

determine an amount to pay said at least one of the suppliers based at least on the determined second value; and determine an operation price for each of the operations based on the determined amount to pay said one of the consumers, the determined amount to pay said at least one of the suppliers, and the determined amount to charge said one of the consumers.

2. The system of claim 1, further comprising a user interface having at least a first portion and a second portion, and wherein the processor is further programmed to:

receive, from said one of the consumers via the first portion of the user interface, resource settings for each of the plurality of resources, said resource settings indicating portions of the resources available to the resource exchange system;

calculate a resource balance for said one of the consumers based on the received resource settings, said calculated resource balance indicating a quantity of the resources in the resource exchange system available to said one of the consumers;

display the calculated resource balance to said one of the consumers in the second portion of the user interface;

receive, from said one of the consumers via the first portion of the user interface, an adjustment of the resource settings; and dynamically update the resource balance displayed in the second portion of the user interface responsive to the received adjustment.

3. The system of claim 2, wherein calculating the resource balance comprises: calculating an average consumption of the plurality of resources; and calculating a maximum consumption of the plurality of resources.

4. The system of claim 2, wherein the processor further displays the resource settings for each of the plurality of resources in the first portion of the user interface.

5. The system of claim 1, wherein the processor is further programmed to correlate an availability of the one or more of the resources with the resource prices of the one or more of the resources.

6. The system of claim 1, wherein the processor is further programmed to increase the determined operation price to generate a profit in the resource exchange system.

7. The system of claim 1, wherein the plurality of resources comprises upload bandwidth, download bandwidth, storage space, and computational capacity.

8. The system of claim 1, wherein each of the operations has an operation type associated therewith, and wherein the processor is programmed to determine the operation price for each of the operations of a same operation type such that a total of the operation prices for performed operations of the same operation type equals a total of the resource prices for the supplied resources.

9. The system of claim 1, wherein the processor is programmed to determine the amount to pay said one of the consumers by determining an amount to pay said one of the consumers for upload bandwidth for a backup operation.

10. The system of claim 1, wherein the processor is programmed to determine the amount to pay said one of the consumers by determining an amount to pay said one of the consumers for download bandwidth for a retrieval operation.

11. The system of claim 1, wherein the memory area further stores a conversion rate, wherein the determined amount to pay said at least one of the suppliers and the determined amount to pay said one of the consumers is represented by credits, and wherein the processor is further programmed to exchange one or more of the credits for currency external to the resource exchange system based on the conversion rate.

12. The system of claim 1, further comprising means for handling a low account balance of said one of the consumers.

13. The system of claim 1, further comprising means for calculating the operation prices and the resource prices.

* * * * *